(12) United States Patent
Gunderson

(10) Patent No.: US 7,481,465 B2
(45) Date of Patent: Jan. 27, 2009

(54) QUICK CONNECTOR FOR HIGH PRESSURE APPLICATIONS, ASSEMBLY TOOL AND METHOD

(75) Inventor: Stephen H. Gunderson, Marine City, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 350 days.

(21) Appl. No.: 11/219,383

(22) Filed: Sep. 2, 2005

(65) Prior Publication Data

US 2007/0052232 A1    Mar. 8, 2007

(51) Int. Cl.
*F16L 37/00* (2006.01)
(52) U.S. Cl. ...................................................... 285/319
(58) Field of Classification Search ................ 285/319, 285/322

See application file for complete search history.

(56) References Cited

U.S. PATENT DOCUMENTS 4,214,586 A * 7/1980 Mericle ...................... 606/154
5,067,754 A * 11/1991 Bartholomew ............... 285/319
5,413,387 A * 5/1995 Bartholomew ............... 285/319
5,423,577 A 6/1995 Ketcham
5,752,726 A 5/1998 Fixemer
6,186,561 B1 * 2/2001 Kaishio et al. .............. 285/319
6,279,966 B1 * 8/2001 Kondo et al. ................ 285/319
6,536,807 B1 * 3/2003 Raymond et al. ............. 285/93
6,540,264 B1 * 4/2003 Yokoyama et al. ........... 285/319
6,866,304 B2 * 3/2005 Kaminski et al. ............ 285/319

* cited by examiner

*Primary Examiner*—David E Bochna
(74) *Attorney, Agent, or Firm*—Leydig, Voit & Mayer Ltd

(57) ABSTRACT

A quick connector coupling assembly to connect a rigid tube to a hollow body component. A retainer releasably retains the tube within a bore in the body. A resilient seal member surrounds the tube and creates a fluid tight seal against the tube and the body defining the bore. A sleeve extends between the seal member and the retainer and transfers axial load on the seal due to pressure to the retainer. In one embodiment a Teflon spacer is interposed between the seal member and the sleeve. A stuffer pin preassembles the sealing and retention elements for insertion into the connector body.

21 Claims, 5 Drawing Sheets

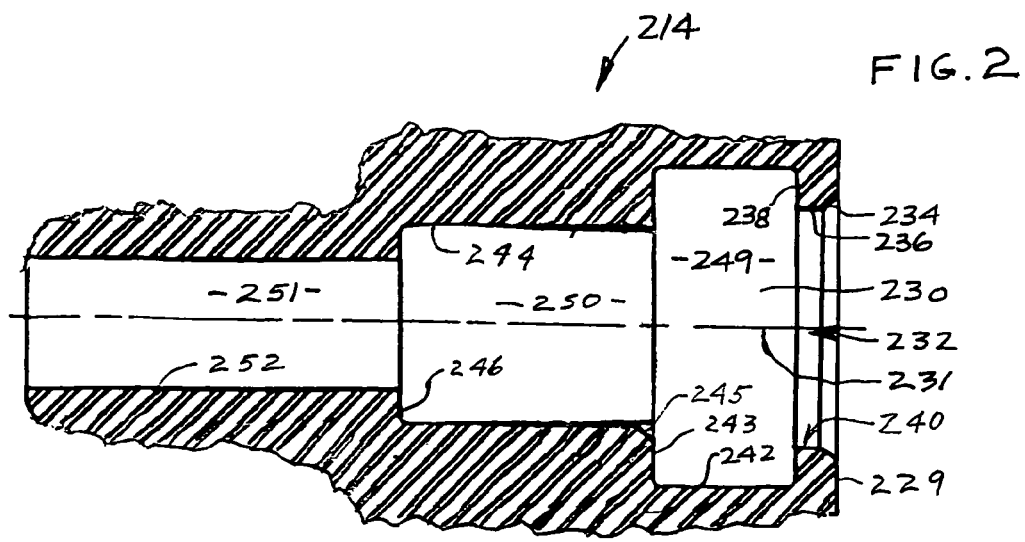
FIG. 2
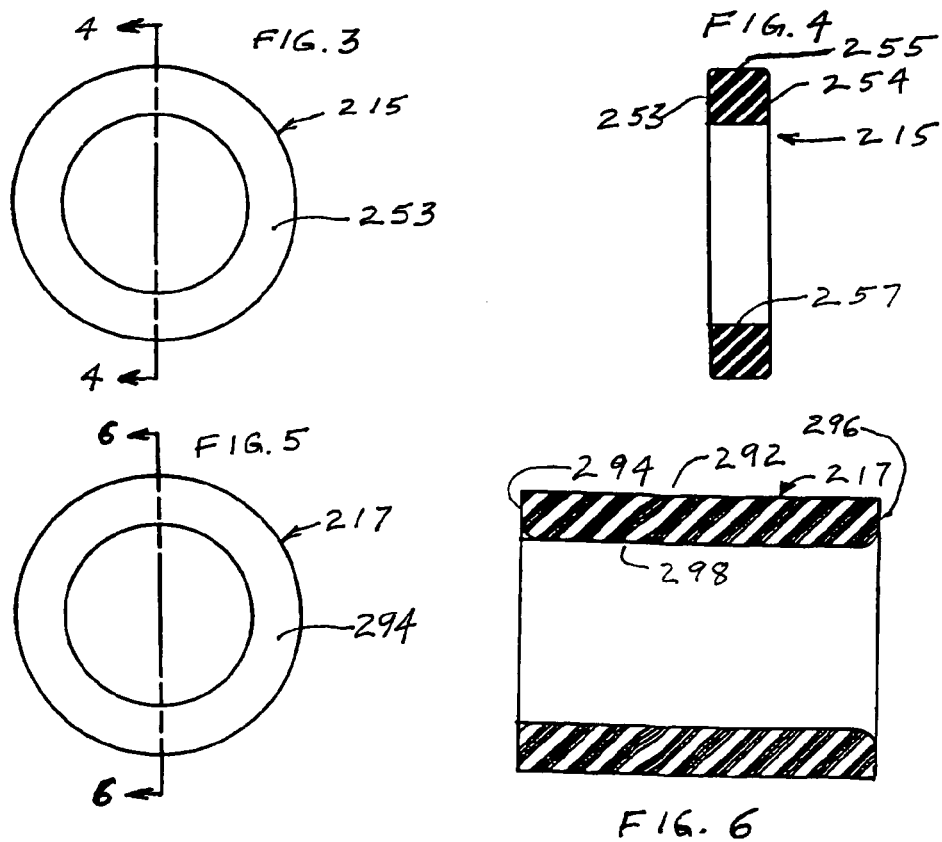
FIG. 3
FIG. 4
FIG. 5
FIG. 6

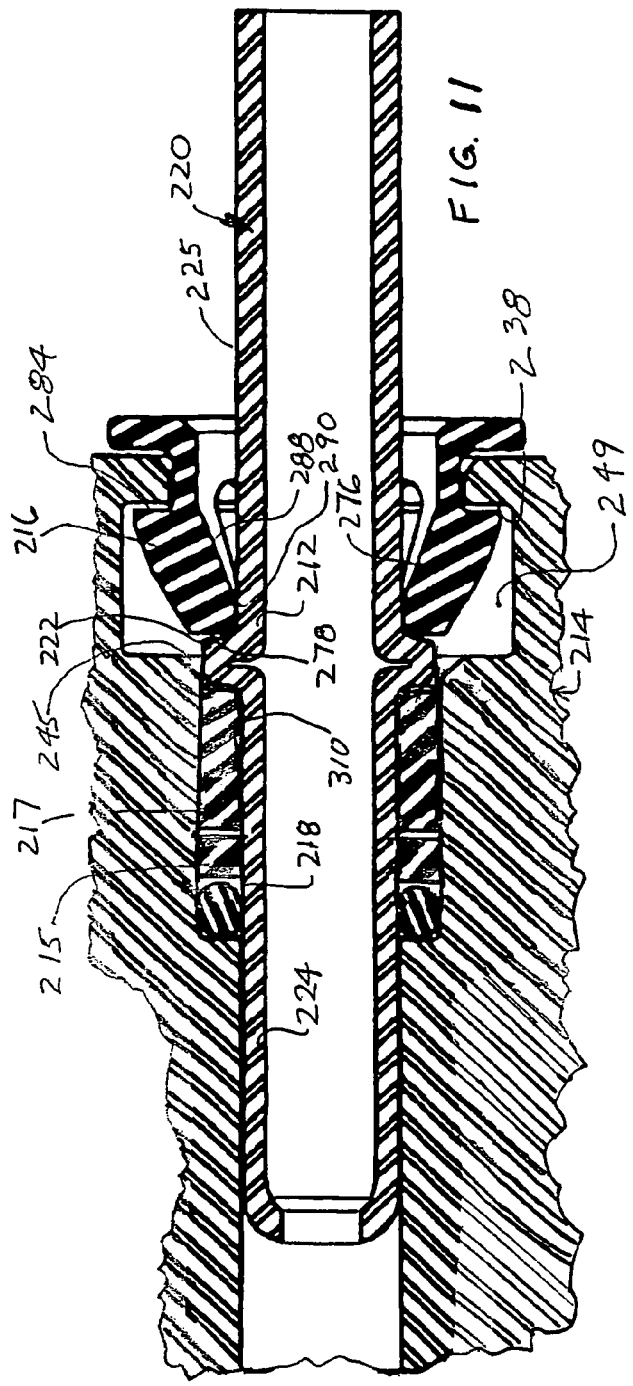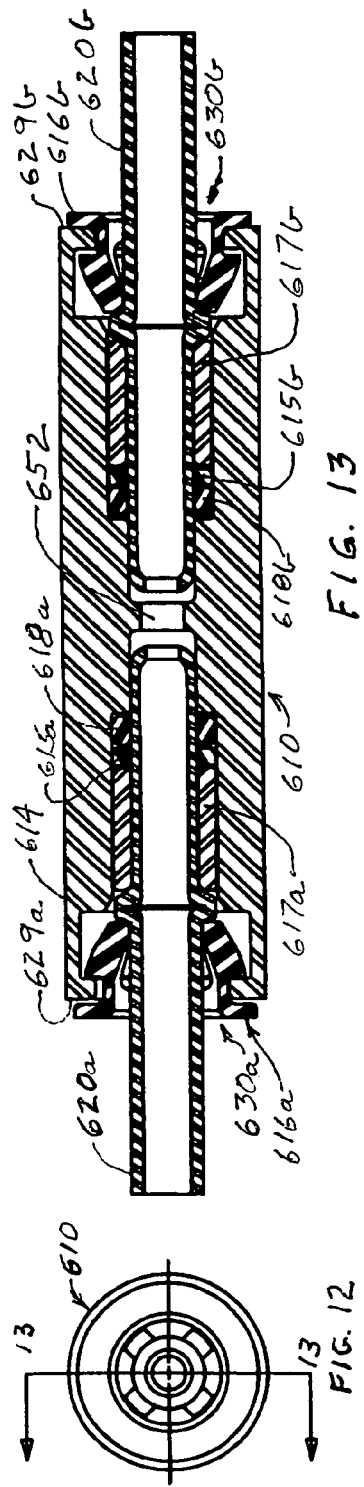

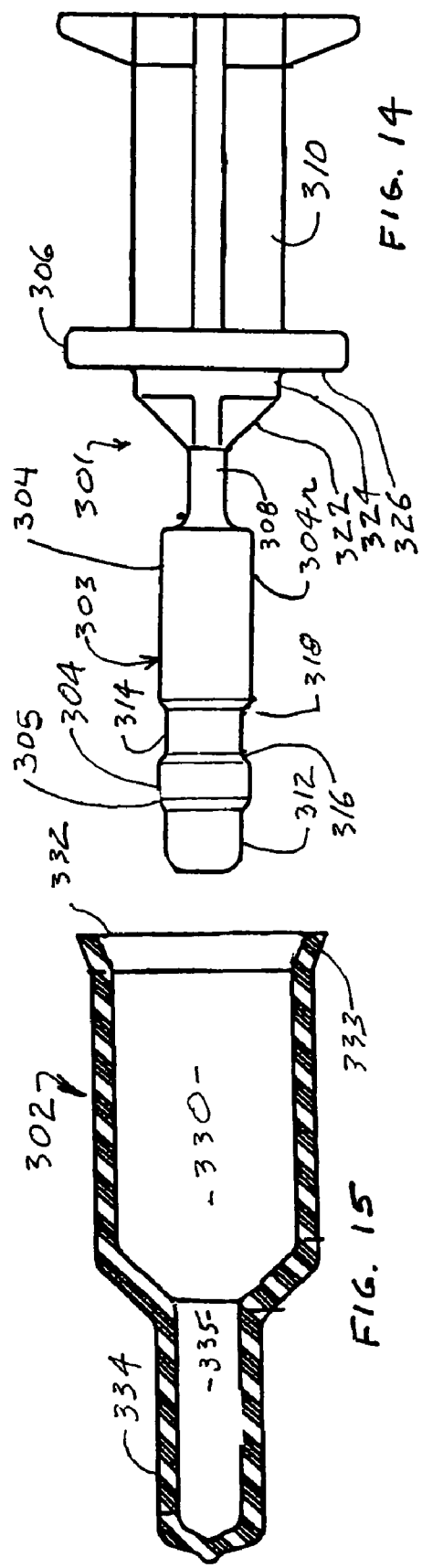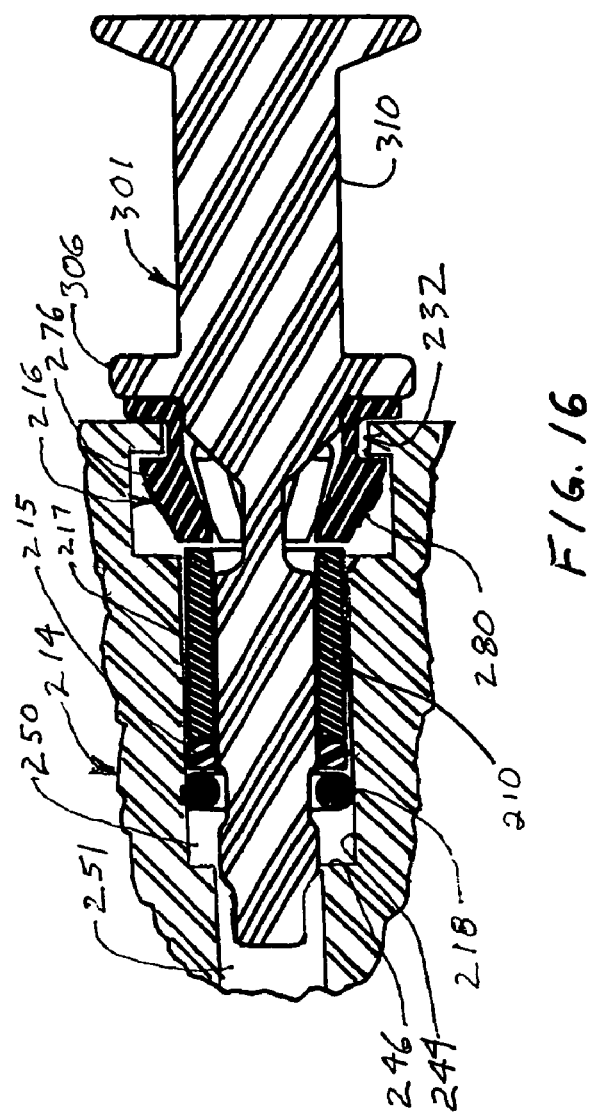

US 7,481,465 B2

QUICK CONNECTOR FOR HIGH PRESSURE APPLICATIONS, ASSEMBLY TOOL AND METHOD

BACKGROUND OF THE INVENTION

This application relates to quick connector coupling assemblies for fluid systems, and more particularly to a quick connector for high pressure applications that releasably connects a male member formed at the end of a hollow tube to a hollow connector body. It also relates to an assembly tool.

In the automotive and other fields, a quick connector coupling assembly is often utilized to provide a fluid connection between two components or conduits which generally include a male member, or tube, received and retained in a female connector body. Use of a quick connector is advantageous in that a sealed and secure fluid line may be established with minimum amount of time and expense.

A retainer is often used to secure the male member within the connector body. One such type of retainer includes a plurality of locking members which extend between a radially enlarged upset formed on the male member and an annular face defined in the connector body. The abutment of the retainer with the upset of the male member at one end and the annular face of the connector body at the other end prevents the withdrawal of the male member from the connector body. This type of retainer is prevalent in the art and has proven effective in many fluid line applications.

A seal member, usually in the form of an O-ring seal, is used with a quick connector coupling to create a fluid tight seal between the male member and the connector body. In such a configuration, the O-ring is located axially inwardly of the retainer and separated by an annular spacer slidably mounted on the male member. It is often held against axial load imparted by fluid pressure by a spacer that is press fit, or in a snap fit relation to the bore in which it is received. Since the retainer is somewhat flexible, and the O-ring is slidably linked with the retainer, the O-ring is able to slide slightly relative to the male member. Also, such quick connector assemblies are often used in applications where the components are subject to high temperature or pressure, as well as vibration and cyclic application of pressure. These conditions increase the difficulty of maintaining a fluid tight joint. In high pressure applications such as automotive brake systems, it is necessary to ensure that the axial force imparted to the components be reliably accommodated.

The present invention incorporates a sleeve arrangement to transfer axial load imparted to the seal ring by fluid pressure to the retainer. In one embodiment, an additional spacer made of Teflon polymer located between the seal member and the sleeve is used to minimize the effects of vibration and cyclic load.

BRIEF DESCRIPTION OF THE DRAWINGS

FIG. 2 is sectional side view of the connector body of the quick connector coupling assembly illustrated in FIG. 1;

FIG. 3 is a front view of the inner spacer element of the quick connector coupling assembly illustrated in FIG. 1;

FIG. 4 is a sectional side view of the spacer of FIG. 3 taken along the line 4-4 of FIG. 3;

FIG. 5 is a front view of the sleeve of the quick connector coupling assembly illustrated in FIG. 1;

FIG. 6 is a sectional side view of the sleeve of FIG. 5 taken along the line 6-6 of FIG. 5;

FIG. 11 is a cross-sectional, assembly view through the quick connector coupling illustrated in FIG. 1;

FIG. 12 is an end view of a double ended tube-to-tube coupling assembly incorporating principles of the present invention;

FIG. 13 is a sectional assembly view of the double ended tube-to-tube coupling assembly of FIG. 12 taken along the line 13-13 of FIG. 12;

FIG. 14 is a side view of a stuffer pin utilized to assemble sealing and retention components of the quick connector coupling assemblies of FIGS. 1-13 into the connector body;

FIG. 15 is a sectional side view of a protective cap for the stuffer pin of FIG. 14; and FIG. 16 is an illustration of a stuffer pin assembly with the seal and retention components in place on the stuffer pin and inserted into a connector body.

DETAILED DESCRIPTION

Figure 1:
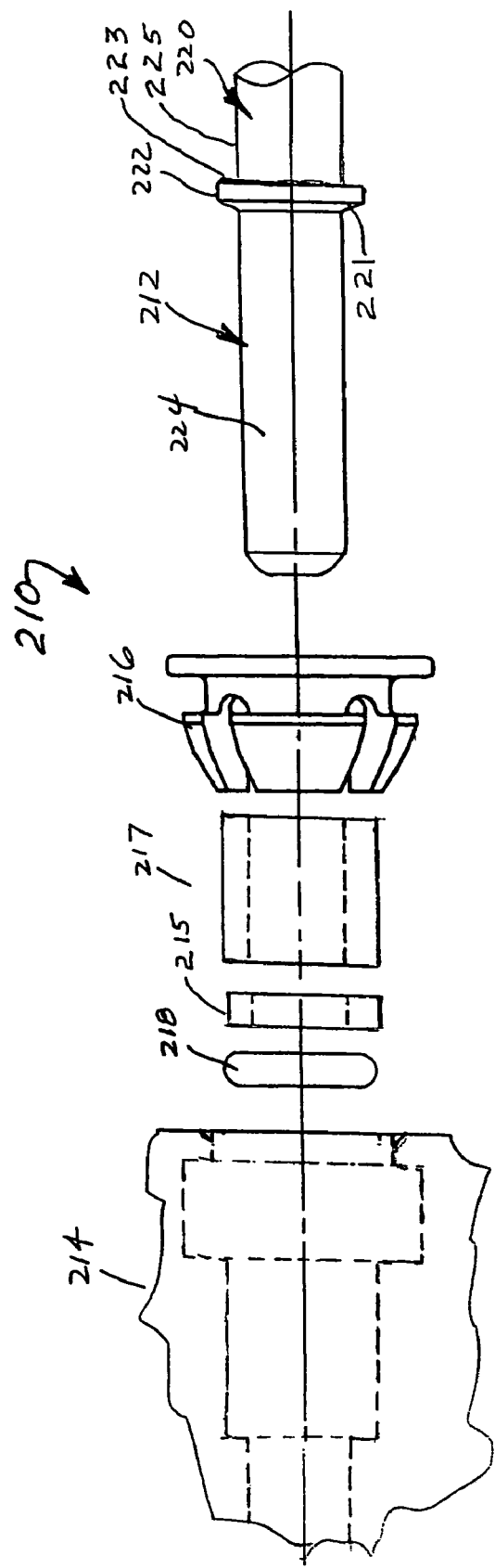
FIG. 1 is an exploded view of a fluid quick connector coupling assembly in accordance with the present invention.
Figure 7:
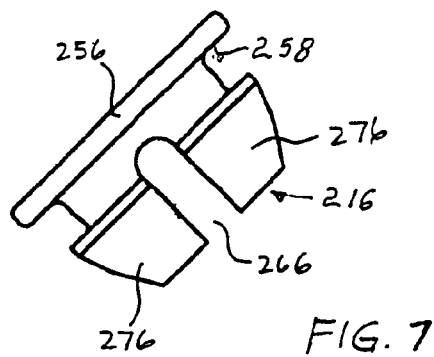
FIG. 7 is a perspective view of the retainer of the quick connector coupling illustrated in FIG. 1.
Figure 8:
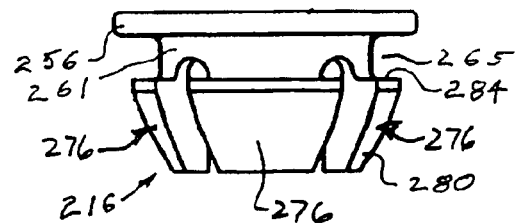
FIG. 8 is a side view of the retainer illustrated in FIG. 7.
Figure 10:
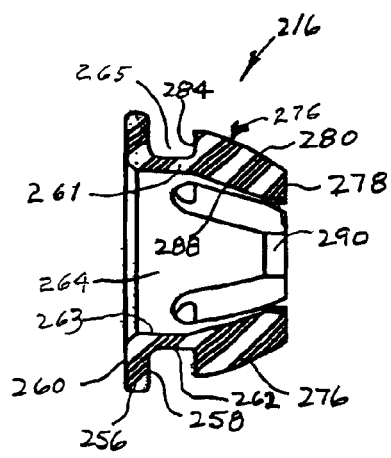
FIG. 10 is a cross-sectional view of the retainer of FIG. 9 taken along line 10-10 in FIG. 9.
Figure 9:
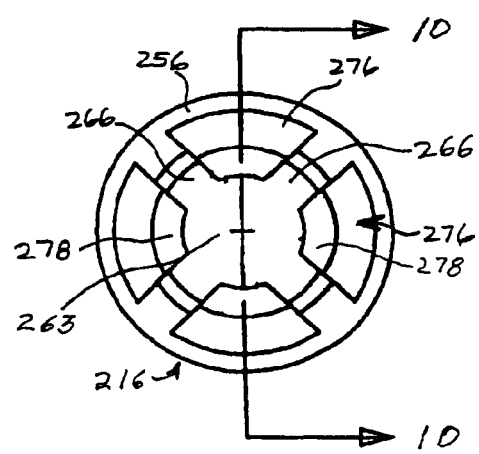
FIG. 9 is a front view of the retainer illustrated in FIG. 7.

An embodiment of a fluid coupling assembly in accordance with the present invention is illustrated in FIGS. 1-11. The quick connector fluid coupling assembly 210 comprises a male member 212, a hollow female connector body 214, a retainer 216 for securing the male member 212 within the connector body 214, a sealing member 218, an inner spacer 215 and an outer spacer or sleeve 217.

The male member 212 is formed by the end of a hollow rigid tube 220. The tube 220 may lead to a component in a fluid line system, or may itself be a portion of a component in a fluid line system. The male member 212 includes a radially enlarged annular upset 222 spaced from the free or terminal end of the tube. It has a forward facing generally radial annular surface 221 and rearward facing generally radial annular surface 223. The male member 212 has a cylindrical portion 224 between the upset 222 and the free end of the tube. A cylindrical portion 225 of the tube extends rearward beyond upset 222 may be coated with Nylon to provide corrosion protection for the remaining length of the tube 220. The coating is removed from the surface 224 from the free end of the tube to the rearward facing surface 223 of upset 222.

The connector body 214 is illustrated in FIG. 2. The connector body 214 is a component of a high pressure fluid system such as a vehicular brake system. The component may be a master cylinder, brake cylinder or brake caliper or other system component. It could, of course, be any body that is configured with a cavity to receive the coupling assembly components and male member. It could also be a body configured with threads to attach to another system component. It could include a stem end, for example, to attach to a flexible hose which is part of a fluid system.

As illustrated in FIG. 2, the connector body 214 is hollow and defines an axial tube, seal and retainer receiving bore 230 extending axially forward from an entrance opening 232 formed in planar wall 229 of body 212. The bore 230 is symmetrical about centerline 231. The bore 230 is divided into three portions: a retainer receiving portion 249, a seal receiving portion 250, and a reduced diameter tube receiving portion 251. The latter portion defines a fluid passage 252 in communication with the interior of body 214.

With regard to connector body 214 the term forward means toward passage 251 from entrance opening 232 and the term rearward means toward entrance opening 232 from passage 251. The term inner or inward means radially toward the centerline 231 and outer or outward means radially away from centerline 231.

Entrance opening 232 is defined by an axially extending cylindrical surface 236 through which the retainer 216 and male member 212 to be placed within bore 230 must pass. Chamfer 234 intersects planar wall 229 of body 214 and axially extending cylindrical surface 236. It facilitates insertion of the retainer 216 into the connector body 214.

Forward of axially extending cylindrical surface 236 is a radially directed annular abutment or locking surface 238 within retainer receiving portion 249 of bore 230. The surface 238 serves as an abutment or locking surface to retain the retainer 216 within the bore 230 which, in turn, releasably retains the male member 212 in fluid tight relation with body 214.

Planar wall 229, chamfer 234, axially extending cylindrical surface 236, and radially directed annular locking or abutment surface 238 define a rim 240 at entrance opening 232 of bore 230. Axially extending cylindrical surface 236 defines the radial innermost wall of rim 240.

Axially forward of the locking surface 238 is an enlarged diameter cylindrical surface 242 followed by a forward radially directed annular surface 243. The radially directed annular locking surface 238, forward radially directed annular surface 243 and enlarged diameter cylindrical surface 242 define the retainer receiving portion 249 of bore 230.

A cylindrical sealing surface 244 having a diameter slightly smaller than the outer diameter of seal member 218 extends from radial surface 243 forward to forwardmost radial annular surface 246. The seal receiving portion 250 of bore 230 is defined by cylindrical sealing surface 244 between forward radially directed annular surface 243 and forwardmost radially directed annular surface 246. A chamfer 245 defines the entrance to the seal receiving portion 250. It intersects forward radial annular surface 243 and cylindrical sealing surface 244 and aids in the installation of the seal ring 218, spacer 215 and sleeve 217.

Axially forward from forwardmost radial annular surface 246 is cylindrical passage 252 which defines the reduced diameter tube receiving portion 251 of axial bore 232. It is sized to closely overlie the outer cylindrical portion 224 of the male member 212 to coaxially pilot the male member 212 within bore 230. Also cylindrical passage 252 communicates fluid within the system to the interior of the body component 214.

Referring to FIG. 11, sealing member 218 provides a seal between cylindrical surface 244 of the bore 230 of connector body 214 and the outer cylindrical sealing surface 224 of male member 212. It resides forward of inner spacer 215 which resides forward of outer spacer or sleeve 217 within seal receiving portion 250 of bore 230 defined by cylindrical surface 244.

Seal member 218 is an annular, elastomeric O-ring that surrounds cylindrical surface 224 of tube 220 between its free end and upset 222 and provides fluid tight joint between the cylindrical seal surface 244 and the cylindrical portion 224 of male member 212. The outer diameter of the O-ring 218 is slightly larger than the diameter of the cylindrical seal surface 244. The inner diameter of O-ring 218 is slightly smaller than the diameter of cylindrical portion 224 of male member 212. When the fluid system is under pressure, the O-ring creates a fluid tight seal against these surfaces, as well as, against inner spacer 215, as will be explained.

As best seen in FIGS. 3 and 4, inner spacer 215 is an annular ring of generally rectangular cross-section. It is made of Polytetrafluorethelene (PTFE) or Teflon (Teflon is a registered trademark of DuPont). It may also be filled with about 13 percent graphite in the Teflon material. It has a forward facing radial annular surface 253 and a rearward facing radial annular surface 254. Surface 253 defines a radial seat surface for O-ring 218. When fluid pressure exists in the system, the O-ring is urged toward the entrance opening 232 of bore 230 and against seat surface 253.

Surface 254 is a radial abutment surface that abuts against sleeve 217. Outer cylindrical surface 255 of spacer 215 has diameter slightly smaller than the diameter of cylindrical seal surface 244 of body 214. The diameter of inner bore 257 of spacer 215 is sized to be slightly larger than the cylindrical surface 224 of male member 212. It is axially slidable relative to these surfaces.

The sleeve 217 is best illustrated in FIGS. 5 and 6. The sleeve 217 is an annular cylindrical ring with an outer surface 292 sized slightly smaller in diameter than cylindrical sealing surface 244 of body 214 and an inner bore 298 slightly larger than surface 224 of male member 212. It is axially slidable relative to these surfaces.

The sleeve 217 has a forward facing radial annular surface 294 and a rearward facing radial annular surface 296. The forward radial annular surface 294 abuts the rearward facing annular surface 254 of spacer 215. Rearward annular surface 296 abuts the forward facing radial surface 221 of upset 222 of male member 212 of tube 220. The inner bore 298 of the spacer 217 is sized to receive and pilot outer cylindrical surface 224 of male member 212.

The sleeve 217 is preferably made of metal. It could be plated or coated steel. Some polymeric materials may also be suitable for use to form the sleeve 217. Steel, such as 12L14 steel, plated with GMW4700 zinc nickel yellow hexavalent chrome free plating is considered suitable for sleeve 217.

It is possible that sleeve 217 be made of a polymeric material. It must be of sufficient strength to withhold the axial loads imparted to it as well as the adverse environment of high or low temperature and frequent pressure pulsation.

The retainer 216 is illustrated in FIGS. 7-10. The retainer 216 includes a cylindrical ring 256 at a first axial end. The ring 256 has a forward facing radial surface 258, a rearward facing radial surface 260 and a reduced diameter cylindrical portion 261 defining an outer surface 262 and an inner cylindrical surface 263. A bore 264 is defined by the ring 256.

Four duckbill shaped flexible locking arms 276 extend axially forward and radially inward from reduced diameter cylindrical portion 261 of the ring 256. Four axially extending elongated slots 266 between each of the adjacent arms 276 separate the arms and extend from the free end into reduced diameter cylindrical portion 261 of the ring 256. The slots 266 allow the arms 276 to flex radially relative to the ring 256 in the area of the reduced diameter cylindrical portion 261.

Each arm 276 has a front abutment surface 278 at its free end, a top ramped surface 280 and a rear abutment surface 284 adjacent its connection to reduced diameter cylindrical portion 261. Each arm 276 has a ramped interior surface 288, and a cylindrical bottom surface 290 adjacent the free end. The forward facing surface 258 of the ring 256, the reduced diameter cylindrical portion 261 of the ring 256, and the rear abutment surfaces 284 of the arms 276 define a channel 265. The channel 265, and thus the reduced diameter portion 261, are configured and sized to allow cylindrical surface 236 of rim 240 of the connector body 214 to be situated and retained in the channel 265 with the rear abutment surfaces 284 of arms 276 in facing abutting relation to radial annular abutment surface 238 within bore 230.

To form the connection as illustrated in FIG. 11, the O-ring seal 218 is positioned within the seal receiving portion 250 of the connector body 214 along with spacer 215 and sleeve 217. These three elements are collectively referred to as the "seal pack" of the coupling assembly. While not necessary, a tool, or a "stuffer pin", can be used to guide and push the components slidably relative to cylindrical sealing surface 244 into the connector body 214. The stuffer pin is then removed and discarded, or possibly reused.

Referring to FIG. 11, the seal ring 218, spacer 215 and sleeve 217 are disposed within seal receiving portion 250 of bore 230 of connector body 214. These components extend collectively from forwardmost radial annular surface 246 to the chamfer 245 at the entrance to the seal receiving portion 250 of the bore 230. It should be understood that in some applications the use of Teflon spacer 215 may not be essential. This is particularly the situation where vibration or cyclic pressure application are not prevalent. In such instance, the sleeve 217 would have an increased axial length that would be equal to the combined length of the spacer 215 and sleeve 217 as illustrated.

The retainer 216 which may be assembled onto the "stuffer pin" along with the seal member 218, spacer 215 and sleeve 217 is attached to connector body 214. As the arms 276 of retainer 216 are inserted into the entrance opening 232 of the connector body 214, the top ramped surface 280 of each arm 276 contacts chamfer 234 and cylindrical surface 236 of rim 240. Insertion of the arms 276 of the retainer 216 axially inward causes the arms 276 to flex radially inward relative to the ring 256 at the reduced diameter cylindrical portion 261. After the arms 276 of retainer 216 have been inserted into the retainer receiving portion 249 of the connector body 214, the arms 276 spring radially outward.

In its properly inserted position, the retainer 216 is constrained on the rim 240 of connector body 214. The cylindrical surface 236 and chamfer 234 of rim 240 reside in channel 265 of the retainer 216. The ring 256 is positioned outside of entrance opening 232 of bore 230 with forward facing surface 258 of the ring 256 disposed in facing relation to the outer planar surface 229 of the body 214 to limit the retainer 216 from further axial forward movement. The locking arms 276 are disposed within retainer receiving portion 249 of bore 230 with rear abutment surfaces 284 of the locking arms 276 abutting the radially directed annular abutment or locking surface 238 within retainer receiving portion 249 to prevent the retainer 216 from moving axially rearward. The retainer 216 thus releasably attached to body 214 at rim 240.

With the seal ring 218, spacer 215, sleeve 217 and the retainer 216 inserted into the connector body 214, male member 212 may be inserted to create a fluid tight connection. As the male member 212 is inserted axially inward through entrance opening 232 the free end of male member 212 passes into bore 264 of retainer 216 and the inner bore 298 of the annular sleeve 217, inner bore 257 of spacer 215 and the inner bore of annular seal member 218. These components surround cylindrical surface 224 and are axially slidable relative to that surface through the seal member is somewhat frictionally engaged to the surface due to the relative outer diameter of the cylindrical surface and the inner diameter of the O-ring 218.

The upset 222 of the male member 212 contacts the bottom ramped surfaces 288 of the arms 276. Since the diameter of the upset 222 is greater than the diameter of portions of the bottom ramped surfaces 288, axially forward insertion of the male member 212 causes the arms 276 to spread radially outward. Once male member 212 has been sufficiently inserted axially forward for the upset 222 to surpass the arms 276, the arms 276 spring radially inward with the front abutment surfaces 278 disposed in facing abutting relation to rearward radial surface 223 of upset 222. The free end of the tube 220 is at this time positioned within and piloted by passage 252 of tube receiving portion 251 of body 214.

It should be noted that as the upset 222 of tube 220 passes forward beyond front abutment surfaces 278 forward radial annular surface 221 contacts rearward radial annular surface 296 of sleeve 217 and urges sleeve 217, spacer 215 and O-ring 218 axially toward forwardmost radial surface 246 in bore 230 of connector body 214. These components slide axially forward until the O-ring is adjacent radial surface 246. The upset is properly positioned forward of front abutment surfaces 278 of locking arms 276.

When so assembled a complete fluid coupling is achieved between tube 220 and component body 214. It is suitable for high pressure applications and can maintain a fluid seal even with high fluid pressure in the system such as an automotive brake system and even against frequent pressure pulsation within the system. For example, a brake system coupling assembly must withstand at least 5,000 pounds per square inch at a temperature of 257° F. (degrees Fahrenheit).

Referring to FIG. 11, the completed connector coupling is maintained by the connection of the retainer 216 to the connector body 214. The retainer locking arms 276 are positioned with forward abutment surfaces 278 in facing abutting relation to rearward radial surface 223 of upset 222 of male member 212 and rearward abutment surfaces 284 in facing abutting relation to radial annular locking surface 238 within retainer receiving portion 249 of bore 232 of body 216. Bottom cylindrical surfaces 290 of each locking arm 276 rests on the cylindrical surface 224 of the male member 212.

O-ring seal 218 within seal receiving portion 250 surrounds cylindrical surface 224 of male member 212. The inner diameter of O-ring 218 seals against cylindrical surface 224 of male member 212 and the outer diameter of O-ring 218 seals against cylindrical sealing surface 244 of body 214.

Spacer 215 is positioned on cylindrical surface 224 of tube 220 and forward facing annular surface 253 faces O-ring 218 for facing abutting sealing contact on pressurization of the fluid system.

Rearward facing annular surface 254 of spacer 215 faces forward facing radial annular surface 294 of sleeve 217. These surfaces are in facing abutting relation. Rearward facing radial annular surface 296 of sleeve 217 faces and is in facing abutting relation with forward facing annular surface 221 of upset 222. Rearward facing annular surface 223 of upset 222 of tube 220 faces, and is in facing abutting relation with, front abutment surfaces 278 of locking arms 276.

Initiation of pressure within the fluid system urges the components within bore 230 rearward toward entrance opening 232. The axial force imparted to O-ring seal member 218 is delivered to spacer 215 and from spacer 215 to sleeve 217 and from sleeve 217 to upset 222. The axial load on the O-ring is thus delivered to duckbill locking arms 278 of retainer 216 which, in turn, transfer that load to connector body 214 at radial annular locking surface 238..

Pressurization of the system also imparts an axial force onto the tube 220 urging it rearward out of entrance opening 232. This axial load is also delivered to locking arms 278 by upset 222. The locking arms 276 transfer axial forces received at abutment surfaces 278 to the radially directed annular locking surface 238 of retainer receiving portion 249 of bore 230 in connector body 214. This force is delivered by the abutment of rear abutment surfaces 284 of locking arms 276 with radially directed annular locking surface 238.

As is well known, disconnection of the tube 220 can be accomplished using a suitable release tool inserted along cylindrical surface 225 of tube 220. Such a tool has an annular shape with an outer surface having a diameter about the same as the outer diameter of upset 222 of tube 220. Insertion of the annular member into bore 264 of retainer 216 along tube surface 225 causes locking arms 276 to deform radially outwardly within retainer receiving portion 249 of bore 230. When arms 276 are sufficiently deformed tube 220 may be withdrawn and upset 222 is free to pass under locking arms 276 to release its connection with the retainer 216.

It should be noted, that with the sealing and retention arrangement of the present invention reassembly of the tube into the connector body (an into the inner diameter of O-ring 218 and inner bore of spacer 215, sleeve 217 and retainer 216) can be achieved with essentially the same axial force imparted to the tube 220 as was initially required. There is no interrelationship between the sealing and retainer components and the bore of the connector body that can be altered or affected by withdrawal of the tube. This feature is potentially beneficial for repair and maintenance activity.

It is preferable that the retainer 216 be molded of a polymeric material of sufficient strength, for example polyetheretherketone, also known as PEEK. A suitable PEEK for forming the retainer and/or spacer of the present invention is available under the trademark Victrex PEEK™ 450G.

FIGS. 12 and 13 illustrate a double ended fluid coupling assembly generally designated 610 embodying the connection and retention elements of the present invention. It is a tube-to-tube coupling, intended to connect one rigid tube 620a to another coaxially aligned rigid tube 620b. The coupling assembly of the embodiment of FIGS. 12 and 13 is useful in a fluid system. It is employed to connect two coaxially aligned rigid tubes together.

The coupling includes an elongate body 614 with a through bore defining a tube, seal and retainer receiving bore 630a and 630b at each end of the coupling body. Bores 630a and 630b define entrance openings at opposite planar walls 629a and 629b. These bores are on a common centerline and are connected by a passage 652 in fluid communication with both bores 630a and 630b.

The bores 630a and 630b are configured as is the bore 230 of the connector body 214 of the embodiment of FIGS. 1-11. Each receives a male member defined by tubes 620a and 620b provided with an upset spaced from the free end of the tube.

Retainer 616a and 616b releasably connect to the coupling body 614 at bores 630a and 630b. Each retainer is configured such as is the retainer 216 of the embodiment of FIGS. 1-11. Each retainer 616a and 616b releasably retains a male member within one of the bores 630a and 630b.

A seal member in the form of O-ring 618a and 618b surrounds a male member and provides a fluid tight seal between the male member and the bore 630a and 630b respectively. The O-rings 618a and 618b seal against the outer surface of the associated tube 620a and 620b and a cylindrical sealing surface within bore 630a and 630b which is as illustrated in the embodiment of FIGS. 1-11.

Annular spacers 615a and 615b are disposed in surrounding relation to the male members adjacent seal members 618a and 618b. Each provides an abutment surface to receive axial load imparted to the O-rings 618a and 618b as in the case of the spacer 215 of the previous embodiment.

An annular sleeve 617a and 617b is disposed in surrounding relation to associated tubes 620a and 620b respectively between spacers 615a and 615b and retainers 616a and 616b. Each is configured as the sleeve 217 of the embodiment of FIGS. 1-11 and receives axial forces imparted to the O-ring seals 618a and 618b by fluid pressure within coupling assembly 610. Sleeves 617a and 617b are made of steel as in the earlier embodiment and deliver axial forces imparted to the seal members to the respective upsets on tubes 620a and 620b. As in the previous embodiment in some applications the spacers 615a and 615b may not be required. In those instances the sleeves 617a and 617b would have an increased axial length equal to the combined axial length of spacer 617a and sleeve 617a or a spacer 617b and a sleeve 617b.

Turning now to FIGS. 14-16, a stuffer pin assembly is illustrated that is employed to temporarily retain, as a pre-assembled sub-assembly, the sealing and retention elements of the connector coupling 210. It is also used to insert those components into the connector body 214, as shown in FIG. 16. The stuffer pin assembly includes stuffer pin 301 shown in FIG. 14 and removable protective cap 302 shown in FIG. 15. The sealing and retention elements are the seal member 218, the spacer 215, sleeve 217 and retainer 216. In some instances, a spacer 215 may not be necessary as has been discussed.

Pin 301 is usually formed of a moldable polymer such as Nylon, PVC or other suitable material. It includes an elongated shaft 303 with an outer cylindrical surface 304 having a diameter the same as the diameter of the outer cylindrical surface 224 of male member 212. A rear portion 305 receives and pilots the shaft 303 within the inner bores 257 of inner spacer 215 and 298 of sleeve 217. Shaft 303 is connected at one end to an enlarged radial disc 306 by a narrowed shaft portion 308 and conical or tapered portion 322. Disc 306 has a radial annular forward facing surface 326. A handle portion 310 extends from disc 306 on the side opposite the shaft 303.

Elongated shaft 303 includes a reduced diameter portion 312 at its free end which serves to guide insertion of the pin 301 into entrance opening 232 of bore 230 in connector body 214. When fully inserted, the reduced diameter portion 312 is within passage 252 of tube receiving portion 251 of body 214.

Spaced from its free end, shaft 303 includes a reduced diameter cylindrical area 314 between shoulders 316 and 318. The diameter of cylindrical area 314 is somewhat less than the inner diameter of O-ring seal 218. The shoulders 316 and 318, therefore, act to releasably retain O-ring 218 in place on shaft 303 during the insertion process.

Tapered portion 322 of stuffer pin 301 defines a rearward directed divergent conical area. It may be a truncated conical surface or it may be formed by a series of molded webs as illustrated. Tapered portion 322 leads from narrowed shaft portion 308 and terminates in an axial cylindrical seat surface 324 at radial annular surface 326 of disc 306. The seat surface 324 is sized to frictionally engage retainer 216 within bore 264 on inner cylindrical surface 263. This frictional engagement releasably holds retainer 216 on stuffer pin 301 until the sealing and retainer components are installed into the connector body 214.

With the retainer 216 installed on stuffer pin 301, the radial annular surface 326 is in abutting relation with rearward facing surface 260 of cylindrical ring 256 of the retainer 216. Axial force imparted to handle 310 is transferred by this abutting relationship to the sealing and retention elements on insertion into a bore 230 of a body 214.

The stuffer pin assembly includes a protective cap 302 shown in FIG. 15. The cap is a molded polymeric part and is used to protect the sealing and retention components before they are inserted into a bore 230 of a connector body 214. It is hollow, and defines a cavity 330 that extends from an opening at entrance end 332. Entrance end 332 is defined by flare 333. When cap 302 is attached to stuffer pin 301 the sealing and retention elements of the fluid coupling assembly, including seal member 218, spacer 215 and sleeve 217 reside within cavity 330 of cap 302. Flare 333 is sized to overlie the top ramped surfaces 280 of locking arms 276 of retainer 216.

Cap 302 has a protrusion 334 and its free end. The protrusion defines a reduced diameter portion 335 of cavity 330. The reduced diameter portion 335 of cavity 330 is sized to frictionally engage reduced diameter portion 312 at the free end of pin 301. The cap 302 is thus releasably held in position on pin 301. Protrusion 334 is also used to remove cap 302 from stuffer pin 301. It is grasped and pulled in the direction away from handle 310 to release the reduced diameter portion 312 at free end of pin 301 from within reduced diameter portion 335 of cavity 330 in cap 302.

Referring to FIG. 16, the handle 310 is used to insert the stuffer pin 301, seal member 218, spacer 215, sleeve 217 and retainer 216 into the bore 230 of a connector body 214. With cap 302 removed, using the handle 310, the pre-assembled components are urged into entrance opening 232 of body 214. The radial annular surface 326 of pin 301 transfers the axial force to retainer 216 at the cylindrical ring 256 of the retainer. The locking arms 276 of the retainer deliver the axial forward motion to the sleeve 217, spacer 215 and seal member 218. The reduced diameter portion 312 at free end of shaft 303 is inserted into bore 230 and is urged toward reduced diameter passage 251. The O-ring seal 218, spacer 215 and sleeve 217 are urged into cylindrical sealing surface 244 of seal receiving portion 250.

As forward insertion continues, the chamfer 234 and cylindrical surface 236 that define entrance opening 232 at rim 240 contact top ramped surface 280 of locking arms 276 urging them to deflect radially inward. The shape of narrowed shaft portion 308 and tapered portion 322 permit this deflection and the locking arms 276 enter the retainer receiving portion 249 of bore 230. When so positioned, the arms 276 spring radially outward to their undeflected shape with the rear abutment surfaces 284 in abutting relation with radially directed annular locking surface 238 within retainer receiving portion 249 of bore 230. The arms 276 are thus locked in place against rearward removal.

The pin 301 can be withdrawn from the connector body entrance opening while the sealing and retainer components remain in place, ready to receive the male member 212 to complete the fluid coupling assembly. Rearward effort on handle 310 causes shaft 303 to pull outward from within the seal member 218, spacer 215, sleeve 217 and retainer 216. The shoulder 316 permits O-ring 218 to exit reduced diameter cylindrical area 314. The pin 301 is thus free to exit the seal and retention elements through bore 264 of retainer 216.

Note in FIG. 16 that when the seal and retention components are inserted into the cylindrical sealing surface 244 in seal receiving portion 250 of bore 230, the O-ring 218 is spaced from forwardmost radial annular surface 246. This position is maintained until the male member 212 is inserted into the body 214 within the bore 264 of retainer 216. As the tube 220 is inserted, upset 222 causes forward radial surface 221 to contact rearward radial annular surface 296 of sleeve 217. Continued insertion causes sleeve 217, spacer 215 and seal member 218 to slide axially forward toward forwardmost radial annular surface 246 until the upset 222 passes beyond the front abutment surfaces 278 of locking arms 276. Once such insertion is complete, the O-ring 218 resides closely adjacent forwardmost radial annular surface 246.

Various features of the present invention have been described with reference to the above illustrative embodiments. It should be understood that modifications may be made without departing from the spirit and scope of the invention.

I claim:

1. A fluid coupling assembly comprising:
    a connector body defining a bore extending axially from an entrance opening defined by a radially inward extending rim, said connector body bore further defining a retainer receiving portion adjacent said rim and a cylindrical sealing surface forward of said retainer receiving portion; said retainer receiving portion including a radially directed annular surface spaced forward of said rim, said body including a forwardmost radially directed annular surface forward of said radially directed annular surface of said retainer receiving portion, said cylindrical sealing surface extending between said radially directed annular surface of said retainer receiving portion and said forwardmost radially directed annular surface;
    a hollow tube within said bore, said tube having a cylindrical surface extending from its free end and a radially directed upset spaced from said free end;
    a retainer releasably secured to said connector body, said retainer including a plurality of axially extending arms extending into said retainer receiving portion of said bore, each said arm including a rear abutment surface and a front abutment surface, said rear abutment surfaces in abutting relation with said rim, and said front abutment surfaces in abutting relation to said upset;
    a seal member disposed in said bore contacting said cylindrical sealing surface and said cylindrical surface of said tube; and
    a sleeve surrounding said cylindrical surface of said tube including a forward facing radial annular surface and a rearward facing radial annular abutment surface and an outer cylindrical surface extending between said forward facing radial annular surface and said rearward facing radial annular abutment surface and axially slidable on said cylindrical surface of said tube and axially slidable in said cylindrical sealing surface of said body, said rearward facing radial annular abutment surface in abutting relation to said upset and wherein said outer cylindrical surface of said spacer is disposed in said cylindrical sealing surface of said body, forward of said radial directed annular surface of said retainer receiving portion of said body.

2. A fluid coupling assembly as claimed in claim 1 wherein said assembly includes an annular spacer made of polytetrafluoroethylene interposed between said seal member and said sleeve, said spacer slidable relative to said cylindrical surface of said tube and said cylindrical sealing surface of said body.

3. A fluid coupling assembly as claimed in claim 2 wherein said spacer has a generally rectangular cross-section.

4. A fluid coupling assembly as claimed in claim 3 wherein said seal member is an O-ring.

5. A fluid coupling assembly as claimed in claim 2 wherein said seal member is an O-ring.

6. A fluid coupling assembly as claimed in claim 2 wherein:
    said spacer includes a forward facing radial annular surface in facing abutting relation to said seal member, said spacer further includes a rearward facing radial annular surface;
    said forward facing radial annular surface of said sleeve in facing abutting relation to said rearward facing radial annular surface of said spacer, and said rearward facing radial annular surface in facing abutting relation to said upset.

7. A coupling assembly as claimed in claim 6, wherein said rim includes a radially directed annular locking surface with said retainer receiving portion, and said rear abutment surfaces of said arms are in abutting relation to said radially directed annular locking surface.

8. A fluid coupling assembly as claimed in claim 7 wherein said spacer has a generally rectangular cross-section.

9. A fluid coupling assembly as claimed in claim 8 wherein said seal member is an O-ring.

10. A fluid coupling assembly as claimed in claim 7 wherein said seal member is an O-ring.

11. A fluid coupling assembly as claimed in claim 6 wherein said seal member is an O-ring.

12. A fluid coupling assembly as claimed in claim 1 wherein said retainer includes a cylindrical ring defining a forward facing radial surface and a reduced diameter cylindrical portion and wherein said locking arms are separated by slots and extend axially forward from said reduced diameter cylindrical portion.

13. A fluid coupling assembly as claimed in claim 12 wherein said slots between said locking arms extend into said reduced diameter cylindrical portion.

14. A fluid coupling assembly as claimed in claimed 13 wherein said forward facing radial surface and said reduced diameter cylindrical portion of said ring and said rear abutment surfaces of said locking arms define a channel, and wherein said rim of said connector body is disposed in said channel.

15. A fluid coupling assembly as claimed in claim 14 wherein said seal member is an O-ring seal.

16. A fluid coupling assembly as claimed in claim 13 wherein said seal member is an O-ring seal.

17. A fluid coupling assembly as claimed in claim 12 wherein said seal member is an O-ring seal.

18. A fluid coupling assembly as claimed in claim 1 wherein said seal member is an O-ring.

19. A fluid coupling assembly as claimed in claim 1 wherein said seal member is an O-ring seal.

20. A fluid coupling as claimed in claim 1 wherein upset is disposed forward of said radially directed annular surface of said retainer receiving portion.

21. A fluid coupling as claimed in claim 20 wherein said seal member is an O-ring seal.

* * * * *

UNITED STATES PATENT AND TRADEMARK OFFICE
CERTIFICATE OF CORRECTION

PATENT NO. : 7,481,465 B2
APPLICATION NO. : 11/219383
DATED : January 27, 2009
INVENTOR(S) : Stephen H. Gunderson Page 1 of 1

It is certified that error appears in the above-identified patent and that said Letters Patent is hereby corrected as shown below:

<u>Col. 10 Claim 1;</u>
Line 41, change "radial" to --radially--

<u>Col. 11 Claim 14;</u>
Line 20, change "claimed" to --claim--

Signed and Sealed this

Thirtieth Day of June, 2009

JOHN DOLL
*Acting Director of the United States Patent and Trademark Office*